United States Patent [19]

Tomaschek et al.

[11] 3,968,186

[45] July 6, 1976

[54] ADHESIVE COMPOSITIONS

[75] Inventors: Heinz Tomaschek, Bad Homburg; Viktor Winkovik, Oberursel, both of Germany

[73] Assignee: USM Corporation, Boston, Mass.

[22] Filed: July 19, 1974

[21] Appl. No.: 490,044

[52] U.S. Cl. .............................. 260/881; 156/331; 260/32.5 N; 428/442; 428/463; 428/492; 428/520
[51] Int. Cl.² ........................................ C08L 33/14
[58] Field of Search ................ 260/78.4 N, 78.5 N, 260/881

[56] References Cited
UNITED STATES PATENTS

| | | | |
|---|---|---|---|
| 2,437,231 | 3/1948 | Mowry | 260/78.5 N |
| 2,765,332 | 10/1956 | Coover et al. | 260/78.4 N |
| 2,816,093 | 12/1957 | Coover | 260/78.4 N |
| 3,223,083 | 12/1965 | Cobey | 260/78.4 N |
| 3,282,773 | 11/1966 | Wicker et al. | 260/78.4 N |
| 3,360,124 | 12/1967 | Stonehill | 260/78.4 N |
| 3,564,078 | 2/1971 | Wicker et al. | 260/78.4 N |
| 3,759,264 | 9/1973 | Coover et al. | 260/78.4 N |

*Primary Examiner*—Harry Wong, Jr.
*Attorney, Agent, or Firm*—Benjamin C. Pollard; Vincent A. White; Richard B. Megley

[57] ABSTRACT

Adhesive compositions based on 2-cyanoacrylate monomers in which viscosity is controlled by dissolved copolymers of an alkyl-2-cyanoacrylate and a styrene.

6 Claims, No Drawings

ADHESIVE COMPOSITIONS

FIELD OF THE INVENTION

This invention is concerned with improvements in or relating to adhesive compositions based on 2-cyanoacrylate.

BACKGROUND OF THE INVENTION

Adhesive compositions based on 2-cyanoacrylates may be used as single-part liquid adhesives for bonding a variety of materials. Examples of materials to which adhesive bonds can be formed by use of 2-cyanoacrylate adhesives include metals, plastics, glass and rubbers, and such materials are met with as parts of precision instruments and household articles. It has also been proposed to use cyanoacrylate based adhesives for bonding blood vessels, living tissue in surgical operations, and vegetable tissue in grafting.

Although adhesive compositions based on 2-cyanoacrylates are potentially suitable for use in a wide variety of applications, 2-cyanoacrylate monomers tend to be very low viscosity materials and their fluidity makes their application difficult to control, for certain applications. Therefore, it is frequently necessary to provide means of controlling the viscosity of 2-cyanoacrylate based adhesive compositions, and various viscosity modifiers or thickeners have been proposed for this purpose.

SUMMARY OF THE INVENTION

It is an object of the present invention to provide an adhesive composition based on 2-cyanoacrylate monomer in which viscosity is controlled by inclusion of a novel agent effective to control viscosity of the adhesive while the cyanoacrylate is in monomeric liquid form and to form a homogenous part and improve plasticization of the adhesive layer after polymerization of the cyanoacrylate.

This and other advantages are obtained according to the present invention by including a copolymer of a cyanoacrylate ester and a styrene soluble in the cyanoacrylate monomer of the adhesive to form a transparent solution and effective in the cured adhesive to give improved plasticity.

DESCRIPTION OF THE PREFERRED EMBODIMENTS

In an adhesive composition according to the present invention, the monomeric cyanoacrylate comprises one or more esters of 2-cyanoacrylic acid according to the general formula

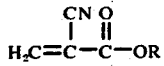

where R is an alkyl or alkenyl group having 1 to 16 carbon atoms, a cyclohexyl group or a phenyl group, and stabilizing additives characterized in that the adhesive includes an amount of a copolymer derived from an alkyl-2-cyanoacrylate and either styrene or methyl styrene.

In an adhesive composition according to the invention, the polymerizable monomer ester of 2-cyanoacrylic acid is preferably methyl-2-cyanoacrylate, ethyl-2-cyanoacrylate, allyl-2-cyanoacrylate or mixtures of these with each other; a proportion of allyl-2-cyanoacrylate suitably about 2% or more by weight based on the weight of the cyanoacrylate, may be found particularly appropriate where good resistance to deterioration of bonds by heat is desirable. For example, in a mixture comprising methyl-2-cyanoacrylate, about 2% by weight of the mixture of allyl-2-cyanoacrylate will give useful improvement in resistance to such deterioration. Other example mixtures are those comprising methyl-2-cyanoacrylate and up to 50% by weight of the mixture of ethyl-2-cyanoacrylate or up to 50% by weight of the mixture of allyl-2-cyanoacrylate.

The copolymer used in an adhesive composition according to the invention to give viscosity control and plastifying action will include as one of its components, methyl styrene, or more preferably styrene, which polymerize fairly readily and to a convenient extent with alkyl-2-cyanoacrylates. The preferred alkyl-2-cyanoacrylates for use in making the copolymer are the lower alkyl materials, e.g. ethyl-2-cyanoacrylate and the more preferred methyl-2-cyanoacrylate. In the copolymer, sufficient of the styrene or methyl styrene will be included to insure the desired solubility of the resultant copolymer in the monomeric cyanoacrylate of the adhesive. The ratio of the materials used is preferably such that the alkyl-2-cyanoacrylate is present to an extent of at least 50% by weight of the copolymer, and preferably such that about 80% by weight of the copolymer is alkyl-2-cyanoacrylate. Preferably, the copolymer has a reduced viscosity of about 0.5 up to about 2.5 (as determined using 0.4 gm of the copolymer in 100 ml of dimethyl formamide) preferably about 1.2 to about 1.5. In order to obtain a desirable viscosity modifying effect, the copolymer is used in quantities to provide up to 20% by weight of the adhesive composition. As little as 1% copolymer by weight of the composition shows a viscosity increasing effect, but the amount of copolymer used to attain a required solution viscosity of an adhesive composition according to the invention is dependent on the molecular weight or reduced viscosity of the copolymer. Thus the type and quantity of copolymer used with a particular 2-cyanoacrylate may be chosen in accordance with viscosity demands imposed by intended application techniques and uses for the adhesive composition. In a preferred adhesive composition comprising monomeric methyl-2-cyanoacrylate, the incorporation of 4% by weight of the composition of a methyl-2-cyanoacrylate-styrene copolymer having a reduced viscosity of 1.48 (0.4 gm in 100 ml dimethyl formamide) leads to an increase in solution viscosity of the adhesive composition to 70 centipoise at 20°C.

The surprising properties of for example methyl-2-cyanoacrylate styrene copolymer as a viscosity modifier may be underlined by the fact that poly(methyl-2-cyanoacrylate) is completely insoluble in monomeric 2-cyanoacrylates whereas the methyl-2-cyanoacrylate copolymer exhibits an unexpected solubility.

In an adhesive composition according to the invention the stabilizing additives include an acidic polymerization inhibitor and a free radical inhibitor. The acidic polymerization inhibitor employed may be for example any one of those materials commonly known as acidic polymerization inhibitors for 2-cyanoacrylates, for example $P_2O_5$ or $SO_2$. Similarly the free radical polymerization inhibitor may be for example one of those materials commonly known as free radical polymerization inhibitors for 2-cyanoacrylates for example hydroquinone or monomethyl ether of hydroquinone. These materials may be used in appropriate quantities. For example, in the preferred compositions, minor quantities of the order of 0.01% to 0.02% (by weight of the composition) monomethyl ether of hydroquinone and of the order of 0.001% (by weight of the composition) of phosphorus pentoxide may be used. Additionally, stabilizing additives which contribute to bond strength performance may be included, for example itaconic acid anhydride as referred to in the U.S. Pat. application Ser. No. 478,514 in the name of Eberhard Konig entitled "Improvements In or Relating to Adhesive Compositions," filed June 12, 1974.

In order that the above and other of the various aspects of the invention may become more clear there are hereinafter described various examples of 2-cyanoacrylate based adhesive compositions of which 10 adhesive compositions are illustrative of the invention. It is of course to be clearly understood that the illustrative examples have been selected for description to illustrate the invention by way of example only and not by way of limitation thereof.

EXAMPLE 1

Preparation of Methyl-2-Cyanoacrylate-Styrene Copolymer

A mixture of monomeric methyl-2-cyanoacrylate (16.0 g.), styrene (4.0 g), and 500 ml petroleum ether having a boiling range of 80° – 110°C. was added to a 1000 ml., 4-neck flask. The mixture was stirred and flushed with dry nitrogen while the temperature was slowly raised to 65°C. to complete the dissolution process. After this azobis-(isobutyronitrile) (0.10 g) was added and stirring ceased. The reaction mixture was held at 80°C. for 2 to 3 hours and the copolymer precipitated. The precipitate was stirred to suspend the precipitated copolymer and then the copolymer was collected on a suction funnel and dried at 60°C. under vacuum. The dried copolymer had a reduced viscosity of 1.48 (0.4 g in 100 ml. dimethyl formamide).

EXAMPLE 2

Preparation of Ethyl-2-Cyanoacrylate-Styrene Copolymer

This copolymer was prepared in a similar manner to that described in Example 1, using 16 g ethyl 2-cyanoacrylate and 4 g styrene, with the only exception that 0.10 gm. benzoyl peroxide was used instead of azobis-(isobutyronitrile). The reduced viscosity of this copolymer measured in dimethyl formamide (0.4 g/100 ml.) was 1.23.

EXAMPLE 3

Copolymers of ethyl 2-cyanoacrylate and styrene were prepared as described in Example 2 but using quantities of ethyl 2-cyanoacrylate and styrene such that the resulting copolymers had styrene contents of 10, 20 and 30% by weight. These copolymers had reduced viscosities of 1.20, 1.25 and 1.30 respectively measured in dimethyl formamide (0.4 g/100 ml.).

EXAMPLE 4

Preparation and Testing Specifications of Viscous Adhesive Compositions

A first base adhesive composition was prepared using monomeric methyl 2-cyanoacrylate and a system of stabilizing additives comprising stabilizing amounts of monomethyl ether of hydroquinone and phosphorus pentoxide, 1% by weight of the adhesive compositions of itaconic acid anhydride and traces of sulphur dioxide.

Eight illustrative adhesive compositions were made up using samples of the base adhesive composition and various amounts of copolymers described in Examples 1 and 2. The corresponding solution viscosity of the adhesive compositions and the tensile shear strength of adhesive bonds formed by use of the compositions are summarized in the table.

The tensile shear strength was evaluated on an Instron Model 1113/4 testing machine at a cross-head separation speed of 10 mm./min. using brass-brass test specimens (dimensions 150 × 10 × mm). The bonded specimens were formed by placing one drop of the composition between overlapping portions of two brass sheets which had been thoroughly cleaned with acetone before application of the composition. The bonds were formed by holding the sheets together and were aged for one hour at room temperature before testing.

Table

| Composition | | Copolymer | Amount % by wt. of the composition | Viscosity (cps at 20°C. of the composition | Tensile Shear Strength (Kp/cm$^2$) |
|---|---|---|---|---|---|
| Base | | | 0 | 3 | 196 |
| 1st | Illustrative | Example 1 | 1 | 11 | 195 |
| 2nd | " | " | 2 | 22 | 197 |
| 3rd | " | " | 3 | 38 | 195 |
| 4th | " | " | 4 | 70 | 198 |
| 5th | " | " | 5 | 120 | 196 |
| 6th | " | Example 2 | 3 | 30 | 198 |
| 7th | " | " | 4 | 40 | 198 |
| 8th | " | " | 5 | 90 | 200 |

EXAMPLE 5

A second base adhesive composition was prepared using monomeric ethyl-2-cyanoacrylate and a system of stabilizing additives comprising stabilizing amounts of monomethyl ether of hydroquinone and phosphorus pentoxide, 1% by weight of the adhesive of itaconic acid anhydride and traces of sulphur dioxide. A ninth illustrative composition was prepared by adding to a sample of the second base adhesive composition sufficient of the ethyl cyanoacrylate - 20% styrene copolymer of Example 3 to provide 5% by weight copolymer in the adhesive composition. The tensile shear strength of sample brass-brass bonds made as described in Example 4 was 153 Kp./cm.$^2$ and the viscosity of the adhesive composition was 85 cps. at 20°C., compared with a tensile shear strength of 150 kp./cm.² for similarly made and tested sample bonds using the second base adhesive composition and viscosity of 4 cps. at 20°C. of the second base adhesive composition.

EXAMPLE 6

A third base adhesive composition was prepared using monomeric allyl-2-cyanoacrylate and a system of stabilizing additives comprising stabilizing amounts of monomethyl ether of hydroquinone and phosphorus pentoxide, 1% by weight of the adhesive of itaconic acid anhydride and traces of sulphur dioxide. A tenth illustrative composition was prepared by adding to a sample of the third base adhesive composition sufficient of the ethyl cyanoacrylate -20% styrene copolymer of Example 3 to provide 5% by weight copolymer in the adhesive composition. The tensile shear strength of sample brass-brass bonds made as described in Example 4 was 152 Kp./cm.² and the viscosity of the adhesive composition was 80 cps. at 20°C., compared with a tensile shear strength of similarly made and tested sample bonds using the third base adhesive composition of 150 Kp./cm.².

Having thus described our invention, what we claim as new and desire to secure by Letters Patent of the United States is as follows:

1. An adhesive composition consisting essentially of one or more polymerizable esters of 2-cyanoacrylic acid according to the general formula

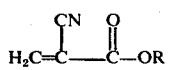

where R is an alkyl or alkenyl group having 1 to 16 carbon atoms, a cyclohexyl group or a phenyl group, and stabilizing additives characterized in that the adhesive includes from about 1% to about 20% by weight of the adhesive composition of a copolymer of from about 50% to about 80% by weight of a lower alkyl-2-cyanoacrylate and from about 50% to about 20% by weight of either styrene or methyl styrene to render said copolymer soluble in said ester of -2-cyanoacrylic acid, said copolymer having a reduced viscosity of from about 0.5 to 2.5 (determined using 0.4 gm. of the copolymer in 100 ml. of dimethylformamide).

2. An adhesive composition consisting essentially of methyl-2-cyanoacrylate monomer and stabilizing additives, characterized in that the adhesive includes from about 1 to about 20% by weight of the adhesive composition of a copolymer of from about 50 to about 80% by weight of a methyl-2-cyanoacrylate and from about 50 to about 20% by weight of either styrene or methyl styrene to render said copolymer soluble in said methyl-2-cyanoacrylate, said copolymer having a reduced viscosity of from about 0.5 to 2.5 (determined using 0.4 gm. of the copolymer in 100 ml. of dimethylformamide).

3. An adhesive composition according to claim 2 wherein said copolymer is a copolymer of styrene and methyl-2-cyanoacrylate or ethyl-2-cyanoacrylate, and has a reduced viscosity of from about 1.2 to about 2.5 (determined using 0.4 gm. of the copolymer in 100 ml. of dimethyl formamide.

4. An adhesive composition according to claim 3 wherein the copolymer provides from about 1% to about 5% by weight of the composition.

5. An adhesive composition according to claim 4 wherein the stabilizing additives include phosphorus pentoxide and monomethyl ether of hydroquinone.

6. An adhesive composition according to claim 5 wherein the stabilizing additives include itaconic acid anhydride.

* * * * *